United States Patent
Lu et al.

(10) Patent No.: US 12,382,380 B2
(45) Date of Patent: Aug. 5, 2025

(54) LINK TRANSMISSION METHOD AND TERMINAL DEVICE

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 537 days.

(21) Appl. No.: 17/538,240

(22) Filed: Nov. 30, 2021

(65) Prior Publication Data
US 2022/0095215 A1 Mar. 24, 2022

Related U.S. Application Data

(63) Continuation of application No. PCT/CN2019/089342, filed on May 30, 2019.

(51) Int. Cl.
*H04W 48/18* (2009.01)
*H04W 48/04* (2009.01)

(52) U.S. Cl.
CPC ........... *H04W 48/18* (2013.01); *H04W 48/04* (2013.01)

(58) Field of Classification Search
CPC ... H04W 48/18; H04W 48/04; H04W 28/086; H04W 72/569; H04W 28/02; H04W 88/06
See application file for complete search history.

(56) References Cited

U.S. PATENT DOCUMENTS

| | | | |
|---|---|---|---|
| 2017/0019910 A1 | 1/2017 | Seo | |
| 2017/0367087 A1* | 12/2017 | Seo | H04W 72/51 |
| 2018/0368175 A1 | 12/2018 | Jeon | |
| 2020/0037306 A1 | 1/2020 | Seo | |
| 2021/0204307 A1* | 7/2021 | Lee | H04W 76/14 |
| 2022/0174682 A1* | 6/2022 | Li | H04W 72/1263 |
| 2022/0217738 A1* | 7/2022 | Lee | H04W 72/54 |

(Continued)

FOREIGN PATENT DOCUMENTS

| | | |
|---|---|---|
| CN | 105338497 A | 2/2016 |
| CN | 107645710 A | 1/2018 |
| CN | 109479292 A | 3/2019 |

(Continued)

OTHER PUBLICATIONS

Vivo. "Uplink and Sidelink Transmission Prioritization in NR V2X", 3GPP TSG-RAN WG2 Meeting #106 R2-1905847, May 17, 2019 (May 17, 2019).

(Continued)

*Primary Examiner* — Marcus Hammonds
(74) *Attorney, Agent, or Firm* — PERKINS COIE LLP

(57) ABSTRACT

A link transmission method and a terminal device are provided. The method includes an operation as follows. Responsive to that a first transmission and a second transmission cannot be performed simultaneously, a terminal device determines to preferentially perform at least one first transmission. The first transmission includes first transmission of different access types and the access types include a Radio Access Technology (RAT).

20 Claims, 8 Drawing Sheets

Mode 3

(56) References Cited

U.S. PATENT DOCUMENTS

2023/0163924 A1* 5/2023 Lee .................. H04W 72/21

FOREIGN PATENT DOCUMENTS

| EP | 3113566 A1 | 1/2017 |
|---|---|---|
| WO | 2018012614 A1 | 1/2018 |
| WO | 2018082571 A1 | 5/2018 |
| WO | 2018084646 A1 | 5/2018 |

OTHER PUBLICATIONS

Vivo. "Remaining Issues on SR for NR Sidelink Mode 1", 3GPP TSG-RAN WG2 Meeting #106 R2-1905840, May 17, 2019 (May 17, 2019).

International Search Report in the international application No. PCT/CN2019/089342, mailed on Feb. 21, 2020.

Vodafone. "New SID: Study on NR V2X", 3GPP TSG RAN Meeting #80 RP-181429, La Jolla, USA, Jun. 11-14, 2018.

First Office Action of the Indian application No. 202117056525, issued on Jun. 24, 2022 (7 pages).

First Office Action of the Chinese application No. 202111638668.5, issued on Mar. 1, 2023. 16 pages with English translation.

Catt, "Prioritization of Uu and SL for NR V2X", 3GPP TSG RAN WG2#106 R2-195803, Internet<URL: https://www.3gpp.org/ftp/tsg_ran/WG2_RL2/TSGR2_106/Docs/R2-1905803.zip>, May 3, 2019. 6 pages.

First Office Action of the Japanese application No. 2021-570838, issued on Mar. 7, 2023. 8 pages with English translation.

Huawei et al: "Summary of remaining issues on bandwidth part and wideband operation", 3GPP Draft; R1-1801347, 3rd Generation Partnership Project (3GPP), RAN WG1, Athens, Greece; Feb. 26, 2018-Mar. 2, 2018 Feb. 17, 2018 (Feb. 17, 2018), XP051397511. 13 pages.

Ericsson: "Coexistence Between Sidelink and Uplink Transmission", 3GPP Draft; R2-1700948, 3rd Generation Partnership Project (3GPP), RAN WG2, No. Athens, Greece; Feb. 13, 2017-Feb. 17, 2017 Feb. 12, 2017 (Feb. 12, 2017), XP051211716. 4 pages.

Supplementary European Search Report in the European application No. 19930697.8, mailed on Apr. 13, 2022. 13 pages.

Written Opinion of the International Search Authority in the international application No. PCT/CN2019/089342, mailed on Feb. 21, 2020. 6 pages with English translation.

First Office Action of the European application No. 19930697.8, issued on Jan. 18, 2023. 10 pages.

Second Office Action of the Japanese application No. 2021-570838, issued on Jun. 16, 2023, 8 pages with English translation.

Second Office Action of the Chinese application No. 202111638668.5, issued on Aug. 12, 2023, 14 pages with English translation.

3GPP TSG-RAN WG2 Meeting #107 R2-1911674, Prague, Czech, Aug. 26-Aug. 30, 2019, Title: [Draft] LS on UL-SL prioritization, Release: Rel-16, Work Item: RAN2: 5G_V2X_NRSL-Core, Source: OPPO [to be RAN2]. the whole document. 2 pages.

3GPP TSG-RAN WG2 Meeting #108 R2-1916466, Reno, United States, Nov. 18-22, 2019, Title: [Draft] Reply LS on UL-SL prioritization, Response to: R2-1914318/R1-1911720, Release: Rel-16, Work Item: NR V2X, Source: OPPO [To be RAN2]. the whole document. 2 pages.

Notice of Allowance of the Japanese application No. 2021-570838, issued on Oct. 13, 2023. 6 pages with English translation.

Supplementary European Search Report in the European application No. 23214742.1, mailed on Mar. 5, 2024. 14 pages.

Hearing Notice of the Indian application No. 202117056525, issued on Apr. 23, 2024. 2 pages with English translation.

First Office Action of the Korean application No. 10-2021-7040127, issued on Oct. 16, 2024, 9 pages with English translation.

\* cited by examiner

LINK TRANSMISSION METHOD AND TERMINAL DEVICE

CROSS-REFERENCE TO RELATED APPLICATIONS

This is a continuation application of International Patent Application No. PCT/CN2019/089342, filed on May 30, 2019, the disclosure of which is hereby incorporated by reference in its entirety.

BACKGROUND

In Vehicle to Everything (V2X) of a $5^{th}$ Generation (5G) New Radio (NR) system, in a scenario where both uplink (UL) transmission and side link (SL) transmission coexist, when the UL transmission and the SL transmission cannot be simultaneously performed, there is no effective solution about how to determine the type of link transmission that is preferentially performed.

SUMMARY

The disclosure relates to the technical field of a wireless communication, and particularly to a link transmission method and a terminal device In order to solve the foregoing technical problem, the embodiments of the disclosure provide a link transmission method and a terminal device, which can determine the type of link transmission that is preferentially performed under a condition that multiple types of link transmission coexist.

According to a first aspect, the embodiments of the disclosure provide a link transmission method, which includes an operation as follows. In a case that first transmission and second transmission cannot be simultaneously performed, a terminal device determines to preferentially perform at least one first transmission. The first transmission includes first transmission of different access types and the access types include a Radio Access Technology (RAT).

According to a second aspect, the embodiments of the disclosure provide a terminal device, which may include a processor and a memory configured to store a computer program capable of running in the processor. The processor is configured to run the computer program to, responsive to that first transmission and second transmission cannot be simultaneously performed, determine to preferentially perform at least one first transmission by the terminal device. The first transmission includes first transmission of different access types and the access types include a Radio Access Technology (RAT).

DETAILED DESCRIPTION

For making the characteristics and technical contents of the embodiments of the disclosure be understood in more detail, implementation of the embodiments of the disclosure are described below in combination with the drawings in detail. The drawings are only adopted for description as references and not intended to limit the embodiments of the disclosure.

Before the embodiments of the disclosure are described in detail, an Internet of vehicles system will be briefly described at first.

The Internet of vehicles system is an SL transmission technology based on Device to Device (D2D) communication. Different from a conventional mode in a Long Term Evolution (LTE) system that communication data is received or transmitted through a base station, communication data is transmitted in a mode of D2D direct communication in the Internet of vehicles system, thereby having higher spectrum efficiency and lower transmission delay.

The V2X is standardized in Third Generation Partnership Project Release-14 (3GPP Rel-14), and two transmission modes including Mode 3 and Mode 4 are defined.

Figure 1:
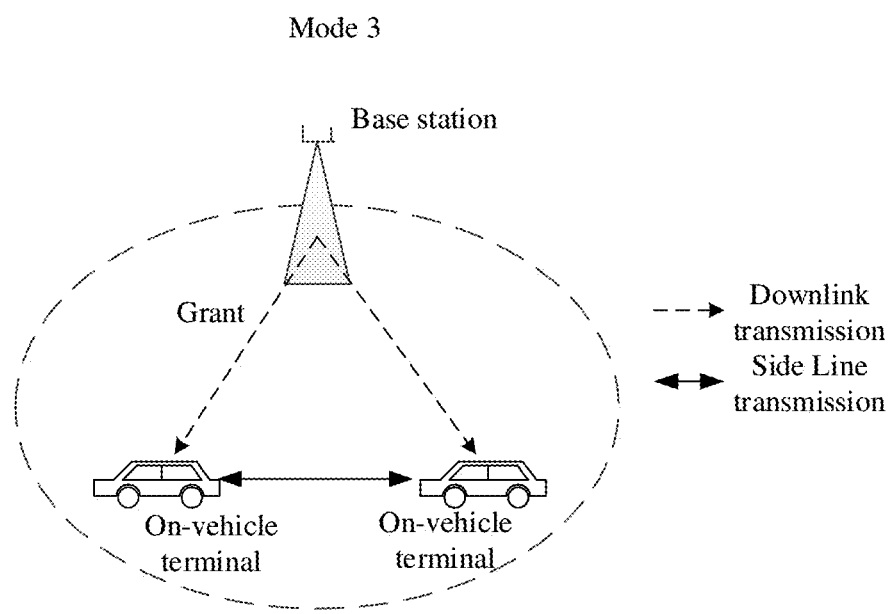
FIG. 1 is a processing flow diagram of data transmission in Mode 3 of the disclosure.

In Mode 3, a data transmission flow is shown in FIG. 1. Side link transmission resources of on-vehicle terminals are allocated by a base station, the on-vehicle terminals send data on a side link according to the resources allocated by the base station. The base station may allocate single transmission resources to the terminals, or may allocate semi-static transmission resources to the terminals.

Figure 2:
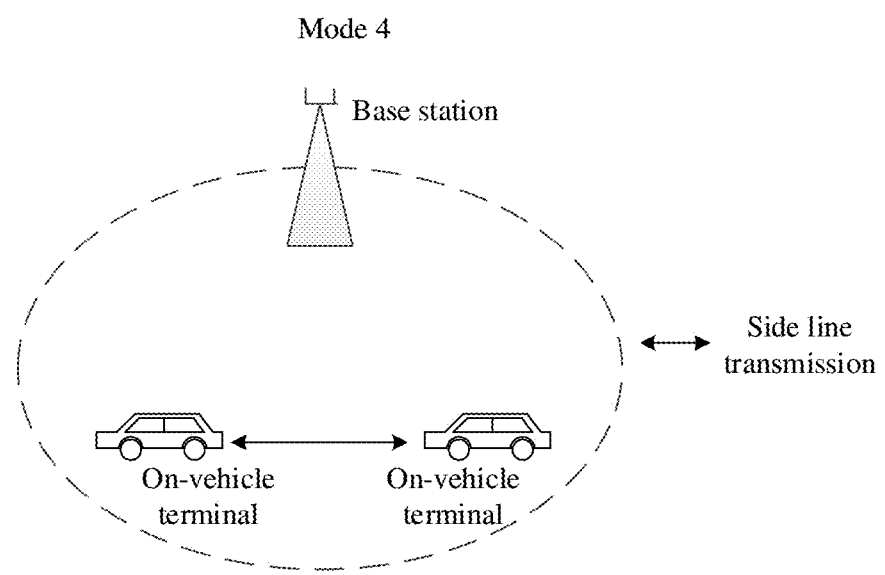
FIG. 2 is a processing flow diagram of data transmission in Mode 4 of the disclosure.

In Mode 4, a data transmission flow is shown in FIG. 2. On-vehicle terminals adopt a transmission manner of sensing and reservation. The on-vehicle terminal obtains an available transmission resource set from a resource pool by means of sensing, and randomly selects one resource from the set to perform side link data transmission. Since services in the Internet of vehicles system have periodicity, the terminal usually adopts a semi-static transmission manner That is, after the terminal selects one transmission resource, the terminal continuously uses the resource in multiple transmission cycles, thereby reducing a probability of resource reselection and resource conflicts. Control information sent by the terminal in this cycle of transmission carries information about reserving a resource for the next transmission, so that other terminals can determine whether the resource is reserved and used by the user by detecting the control information of the user, thereby reducing resource contention.

In LTE-V2X (LTE-V2X), a dedicated carrier may be used in SL transmission, or the SL transmission shares a carrier with UL transmission. When the SL transmission and the UL transmission share a carrier, only UL transmission resources can be used by the SL transmission. For example, a UL subframe of a Time Division Duplexing (TDD) system or a UL carrier of a Frequency Division Duplexing (FDD) system may be used. UL transmission cannot use a DownLink (DL) resource, thereby avoiding interference to the terminal.

Figure 3:
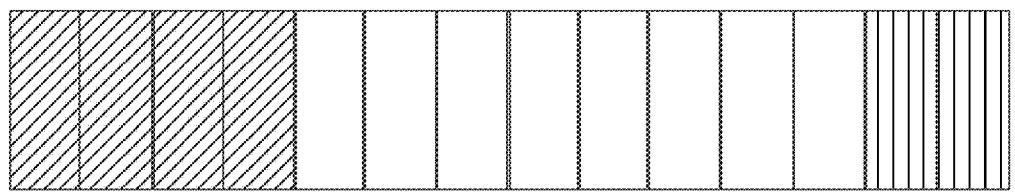
FIG. 3 is a schematic diagram of a slot structure of the disclosure.
Figure 4:
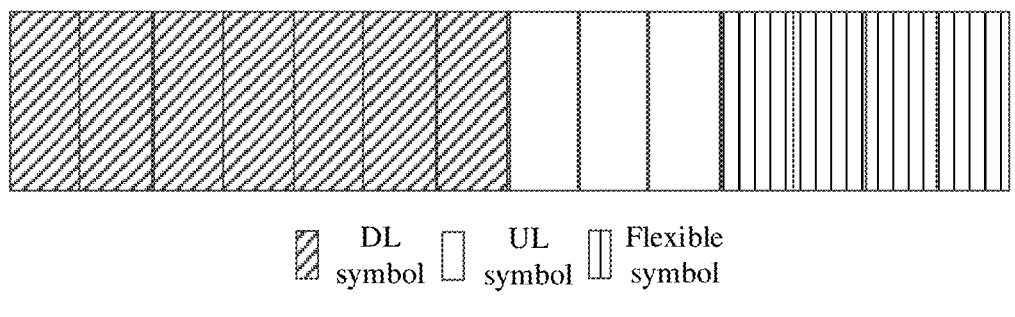
FIG. 4 is a schematic diagram of another slot structure of the disclosure.

In an NR system, different slot structures may be supported in a cell, that is, one slot may include at least one of a DL symbol, a UL symbol or a flexible symbol, and the number of the DL symbols, the number of the UL symbols and the number of the flexible symbols are all configurable. The flexible symbols indicate indeterminate transmission directions. FIG. 3 is a schematic diagram of a slot structure. One slot includes four DL symbols, two UL symbols and eight flexible symbols. FIG. 4 is a schematic diagram of another slot structure. One slot includes seven DL symbols, four UL symbols and three flexible symbols.

In actual applications, the transmission directions indicated by the flexible symbols may be changed through configuration information or Downlink Control Information (DCI). For example, the flexible symbols may be changed to DL symbols through the DCI, or the flexible symbols may be changed to UL symbols through the DCI. For another example, a transmission direction may be implicitly determined through configuration information. For example, when transmission of a Synchronization Signal Block (SSB) is configured on the flexible symbol, it can be determined that the flexible symbol indicates DL transmission.

In an NR-V2X system, a network device may configure flexible symbols for SL transmission, may also configure flexible symbols for UL transmission, or may configure flexible symbols for DL transmission. If one transmission resource is used for both SL transmission and UL transmission, there is still no effective solution about determining which of SL transmission and UL transmission is performed by the transmission resource.

Further, in a case that that UL and SL transmission of different Radio Access Technologies (RATs) coexist and the UL and SL transmission of different cell groups coexist, there is still no effective solution about how to determine whether the uplink resource is used for UL transmission or SL transmission.

Based on the foregoing problem, the disclosure provides a transmission method. The transmission method of the embodiments of this disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, or a future 5G system.

Figure 5:
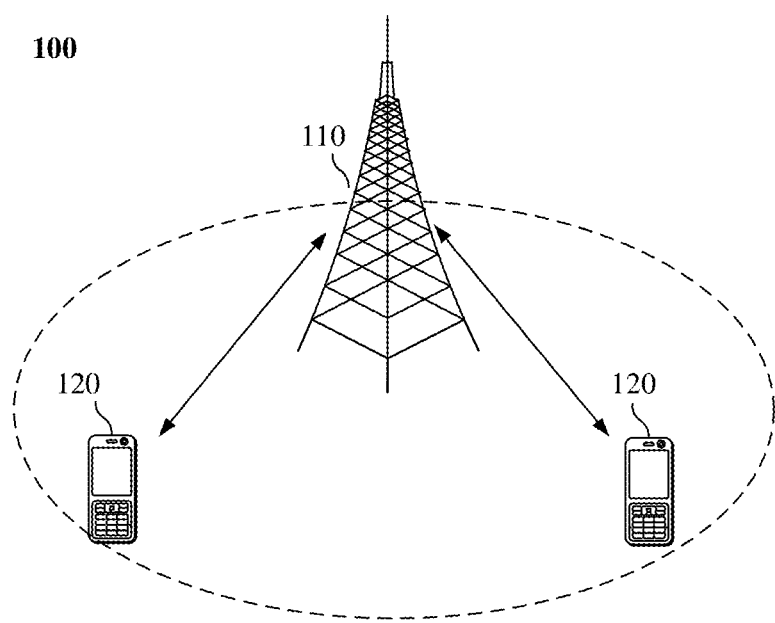
FIG. 5 is a composition structure diagram of a communication system according to an embodiment of the disclosure.

Exemplarily, FIG. 5 shows a communication system 100 to which the embodiments of this disclosure are applied to. The communication system 100 may include a network device 110. The network device 110 may be a device communicating with a terminal device 120 (or referred to as a communication terminal and a terminal). The network device 110 may provide a communication coverage for a specific geographical region and communicate with a terminal device in the coverage. Optionally, the network device 110 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a future 5G network, a network device in a future evolved Public Land Mobile Network (PLMN), etc.

The communication system 100 further includes at least one terminal device 120 within the coverage of the network device 110. The terminal device used herein includes, but is not limited to be connected through a wired line connection, for example, through a Public Switched Telephone Network (PSTN), a Digital Subscriber Line (DSL), a digital cable and a direct cable connection, and/or another data connection/network and/or through a wireless interface, for example, through a cellular network, a Wireless Local Area Network (WLAN), a digital television networks like a Digital Video Broadcasting-Handheld (DVB-H) network, a satellite network or an Amplitude Modulated (AM)-Frequency Modulated (FM) broadcast transmitter, and/or via a device, configured to receive/send a communication signal, of another terminal, and/or Internet of Things (IoT) device. The terminal device configured to communicate through a wireless interface may be called a "wireless communication terminal", a "wireless terminal" or a "mobile terminal". Examples of mobile terminals include, but are not limited to: a satellite or cellular telephone; a Personal Communications System (PCS) terminal capable of combining a cellular radio telephone and data processing, faxing and data communication capabilities, a Personal Digital Assistant (PDA) capable of including a radio telephone, a pager, Internet/Intranet access, a Web browser, a notebook, a calendar and/or a Global Positioning System (GPS) receiver; and a conventional laptop and/or palmtop receiver or other electronic devices including a radio telephone transceiver. The terminal may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cellphone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an in-vehicle device, a wearable device, a terminal device in the 5G network, a terminal device in the future evolved Public Land Mobile Network (PLMN) etc.

Optionally, the terminal device 120 may perform D2D communication.

Optionally, the 5G system or the 5G network may also be referred to as an NR system or an NR network.

FIG. 5 exemplarily shows one network device and two terminal devices. Optionally, the communication system 100 may include multiple network devices, and another number of terminal devices may be provided in coverage of each network device, which is not limited in the embodiments of this disclosure.

Optionally, the communication system 100 may further include another network entity such as a network controller and a mobility management entity, which is not limited in the embodiments of this disclosure.

It is to be understood that a device having a communication function in the network/system in the embodiments of this disclosure may be referred to as a communication device. Taking the communication system 100 shown in FIG. 5 as an example, the communication device may include the network device 110 and terminal device 120 having the communication function, and the network device 110 and the terminal device 120 may be the specific devices as described above and will not be elaborated herein. The communication device may further include other devices in the communication system 100, for example, other network entities like a network controller and a mobility management entity, which is not limited in the embodiments of this disclosure.

Figure 6:
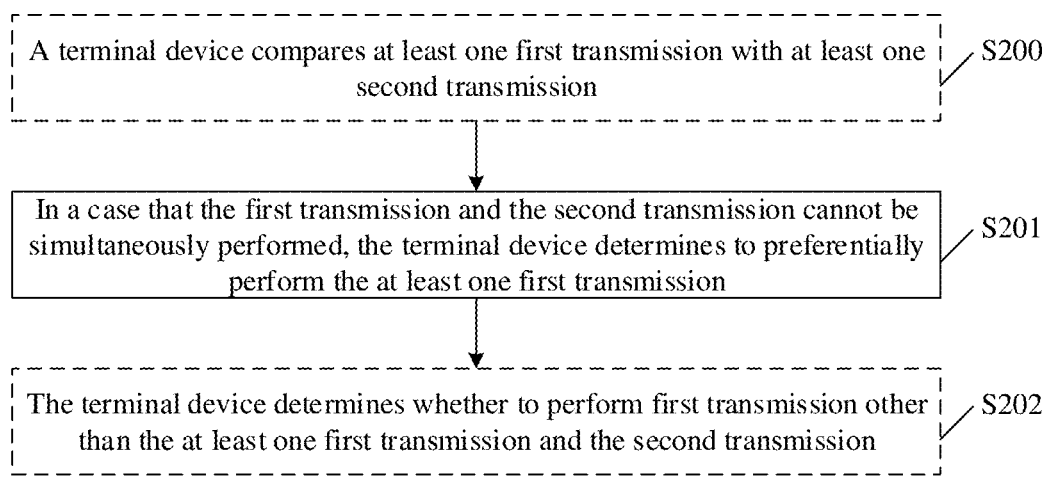
FIG. 6 is an optional processing flow diagram of a link transmission method according to an embodiment of the disclosure.

As shown in FIG. 6, an optional processing flow of a link transmission method according to an embodiment of the disclosure includes the following operations.

In S201, in a case that first transmission and second transmission cannot be simultaneously performed, a terminal determines to preferentially perform at least one first transmission.

Here, the case that first transmission and second transmission cannot be simultaneously performed includes, but is not limited to, at least one of the following: the first transmission and the second transmission use the same time-domain resources or time-domain resources that are in conflict, the terminal device does not have sufficient power, the terminal device cannot support a combination of bands corresponding to the first transmission and the second transmission, or there is no enough switching time for the terminal device.

The first transmission includes first transmission of different access types, and the second transmission includes second transmission of different access types. The access types at least include one of the following: radio access technology (RAT) or a cell group. For example, the RAT is the LTE or the NR; and the cell group is a primary cell group or a secondary cell group. Therefore, the case that first transmission and second transmission cannot be simultaneously performed may include a case that at least two of first transmission of a different RAT, second transmission of a different RAT, and first transmission of a different cell group and second transmission of a different cell group cannot be simultaneously performed.

In specific implementation, the terminal device determines whether a first type of first transmission exists; and responsive to that the first type of first transmission exists, the terminal device preferentially performs the first type of first transmission. The basis on which the terminal device determines whether the first type of first transmission exists includes: different scenarios. The different scenarios include at least one of the following: whether the terminal device supports cross-RAT configuration, whether a network device supports cross-RAT configuration, whether the terminal device supports to perform Time Division Multiplexing (TDM) switch transmission among different PC5 RATs, or whether the terminal device supports PC5 transmission of multiple RATs. For example, if at least one of the following cases that the terminal device does not support cross-RAT configuration, the network device does not support cross-RAT configuration, the terminal device does not support to perform TDM switch transmission among different PC5 RATs, or the network device does not support TDM switch transmission among different PC5 RATs is met, for an LTE side link and an NR uplink, the terminal device determines whether to preferentially perform side link transmission only based on a priority of a PC5, in a case that the terminal device has no Random Access Channel Message 1/Message 3 (RACH MSG 1/MSG 3), or emergency Protocol Data Unit (PDU) connection in the uplink. For example, the terminal device determines whether to preferentially perform side link transmission according to that the priority of the PC5 is higher or lower than a preset threshold. Correspondingly, if at least one of the cases that the terminal device supports cross-RAT configuration, the network device supports RAT configuration, the terminal device supports to perform TDM switch transmission among different PC5 RATs, or the network device supports to perform TDM switch transmission among different PC5 RATs is met, the terminal device determines whether to preferentially perform side link transmission according to at least one of whether a priority of uplink transmission is higher or lower than a preset threshold, whether there is uplink transmission with a priority higher or lower than that of SL transmission, whether uplink transmission has a transmission type which is required to be transmitted preferentially other than network configuration.

In some embodiments, as long as the first type of first transmission of any access type exists, the terminal device preferentially performs the first type of first transmission. That is, regardless of the access type of the first type of first transmission (such as the RAT or the cell group), the terminal device preferentially performs the first type of first transmission. Optionally, the first type is configured in advance or is configured by a network device configuration. The first types configured in advance or configured by the network device configuration for different access types may be identical or different. For example, the first type of the primary cell group and the first type of the secondary cell group may be identical or different. The network configuration is configuration sent by the network device to the terminal device in real time, and includes configuration based on a logic channel attribute and/or configuration based on a logic channel identifier. The logic channel attribute may include a transmission type and/or a logic channel priority. For example, the transmission type is a random access channel (RACH), emergency, or the like. The first type configured based on the transmission type indicates that first transmission of a specific transmission type is the first type of first transmission. The first type configured based on the logic channel priority indicates a logical channel having a priority higher than a specific value is the first type of first transmission. The first type configured based on the logic channel identifier indicates a specific logic channel is the first type of first transmission.

In some other embodiments, under the condition that the first type of first transmission of different access types exists, it is determined on the basis of the logic channel attribute that at least one of the first type of first transmission is preferentially performed. For example, in a case that the first type of first transmission of a RAT (which includes the LTE and the NR) and the first type of first transmission of a primary cell group and a secondary cell group exist, the terminal device compares the first type of first transmission of different access types based on the logic channel attribute, and selects at least one first type of first transmission from the first type of first transmission of different access types, and perform preferentially the selected at least one first type of first transmission. Here, the logic channel attribute includes a logic channel priority. That is, the first type of first transmission having a higher logic channel priority is preferentially performed.

It is to be noted that the terminal determines to preferentially perform at least one first transmission, after or before a Media Access Control (MAC) Protocol Data Unit (PDU) of at least one first transmission is generated. For example, the terminal device determines to preferentially perform at least one first transmission after the MAC PDU of the at least one first transmission has been stored in a Hybrid Automatic Repeat Request (HARQ) cache. Alternatively, the terminal device determines to preferentially perform at least one first transmission before a first processing time. The first processing time is a time at which a physical (PHY) layer entity of the terminal device can complete the at least one first transmission, and the first processing time is related to parameters such as a subcarrier spacing and a symbol length. Therefore, the first processing time for side link transmission is different from that for uplink transmission.

In the embodiment of the disclosure, when the terminal device determines to preferentially perform the at least one first transmission, an MAC layer entity of the terminal device sends information to the PHY layer entity. The PHY layer entity determines whether to perform the at least one first transmission based on the information. The information includes at least one of a data attribute, a logical channel attribute, a data priority or a logical channel priority. Alternatively, the information includes first transmission that is preferentially performed. When the information includes the first transmission that is preferentially performed, the PHY layer entity directly determines to preferentially perform the first transmission contained in the information according to the information.

Before S201 is executed, the method further includes the following operation.

In S200, a terminal device compares the at least one first transmission with at least one second transmission.

In some embodiments, the at least one second transmission includes at least one second transmission selected according to different access types. For example, second transmission is side link transmission, and the access type is RAT. In second transmission of different RATs, second transmission which can be supported by the terminal device and has a priority higher than a preset threshold is selected according to the order of priority from high to low, and the terminal device compares the at least one first transmission with the selected second transmission.

In some other embodiments, the at least one second transmission includes: second transmission of the same access type as the at least one first transmission. For example, in a case where the at least one first transmission is first transmission of a primary cell group, the at least one second transmission is also second transmission of the primary cell group. Correspondingly, after comparing the first transmission with the second transmission which have the same access type, the terminal device further compares the at least one first transmission with first transmission of a different access type, and/or second access transmission of a different access type. Still taking the at least one first transmission for the primary cell group as an example, after comparing first transmission of the primary cell group with second transmission of the primary cell group, the terminal device further compares the first transmission of the primary cell group with first transmission of a secondary cell group and/or second transmission of a secondary cell group.

In some other embodiments of the disclosure, when the at least one second transmission is a second type of second access transmission, the at least one first transmission is preferentially performed. That is, when the at least one second transmission is the second type of second access transmission, comparison between the first transmission and the second transmission is omitted, and the at least one first transmission is directly preferentially performed. The second type is configured in advance or configured by a network device configuration. The second types configured in advance or configured by the network device configuration for different access types may be identical or different. For example, the second type of a primary cell group and the second type of a secondary cell group may be identical or different. The network configuration is a configuration sent by the network device to the terminal device in real time, and includes configuration based on a logic channel attribute, and/or configuration based on a logic channel identifier. The logic channel attribute may include a transmission type, and/or a logic channel priority. For example, the transmission type is a random access channel (RACH), or emergency or the like. The second type configured based on the transmission type indicates that second transmission of a specific transmission type is the second type of second transmission. The second type configured based on the logic channel priority indicates that a logical channel with a priority lower than a specific value is the second type of second transmission. The second type configured based on the logic channel identifier indicates that the specific logic channel is the second type of second transmission.

After S201 is executed, the method further includes the following operation.

In S202, the terminal device determines whether to perform first transmission other than the at least one first transmission and second transmission.

In specific implementation, the terminal device firstly determines whether to support simultaneously performing the at least one first transmission and the at least one second transmission. If it is determined that simultaneously performing the at least one first transmission and the at least one second transmission is supported, the terminal device further determines whether to perform the first transmission other than the at least one first transmission and second transmission.

In some embodiments, the terminal device determines not to perform the first transmission other than the at least one first transmission and/or second transmission. That is, after preferentially performing the at least one first transmission, the terminal device does not perform other first transmission and/or second transmission.

In some other embodiments, the terminal device determines to perform first transmission other than the at least one first transmission. That is, after preferentially performing the at least one first transmission, the terminal device also performs other first transmission. In specific implementation, the access type of the other first transmission performed by the terminal device is the same as or different from the access type of the at least one first transmission that is performed preferentially. Alternatively, the other first transmission performed by the terminal device refers to all first transmission other than the first transmission that is preferentially performed.

In other embodiments, the terminal device determines to perform at least one second transmission. That is, after preferentially performing the at least one first transmission, the terminal device also performs at least one second transmission. In specific implementation, the access type of the at least one second transmission performed by the terminal device is the same as or different from the access type of the at least one first transmission that is preferentially performed.

It is to be noted that the terminal device determines whether to perform the first transmission other than the at least one first transmission and second transmission, after or before an MAC PDU of first transmission other than the at least one first transmission and/or an MAC PDU of second transmission is generated. For example, the terminal device determines to perform the first transmission other than the at least one first transmission, after an MAC PDU of the first transmission other than the at least one first transmission has been stored in an HARQ cache. Alternatively, the terminal device determines to perform second transmission before a second processing time. The second processing time is a time at which the physical layer entity of the terminal device can complete the corresponding second transmission, and the second processing time is related to parameters such as a subcarrier spacing and a symbol length. Therefore, the second processing time for side link transmission is different from that for uplink transmission.

In the embodiment of the disclosure, when the terminal device determines whether to perform the first transmission other than the at least one first transmission and second transmission, the MAC layer entity of the terminal device sends information to the PHY layer entity. The PHY layer entity determines whether to perform the first transmission other than the at least one first transmission and second transmission based on the information. The information includes at least one of a data attribute, a logical channel attribute, a data priority or a logical channel priority. Alternatively, the information includes at least one of the first transmission or the first transmission that is preferentially performed. When the information includes at least one of the first transmission or the second transmission that is preferentially performed, the PHY layer entity directly determines to preferentially perform the first transmission and/or the second transmission according to the information.

In the abovementioned embodiment of the disclosure, the first transmission is uplink transmission, and the second transmission is side link transmission. Alternatively, the first transmission is side link transmission, and the second transmission is uplink transmission. The first transmission includes at least one of a data channel or a control channel, and the second transmission includes at least one of a data channel or a control channel. For example, the data channel includes a Physical Uplink Shared Channel (PUSCH) and a Physical Sidelink Shared Channel (PSSCH), and the control channel includes a Physical Uplink Control Channel (PUCCH)), a Physical Sidelink Control Channel (PSCCH) and a Physical Sidelink Feedback Channel (PSFCH).

With the link transmission method and the terminal device according to the embodiments of the disclosure, in a case that first transmission and second transmission cannot be simultaneously performed, a terminal device determines to preferentially perform at least one first transmission. Therefore, the problem that it is unable to determine to perform which transmission when the first transmission and the second transmission are in conflict can be solved.

Figure 7:
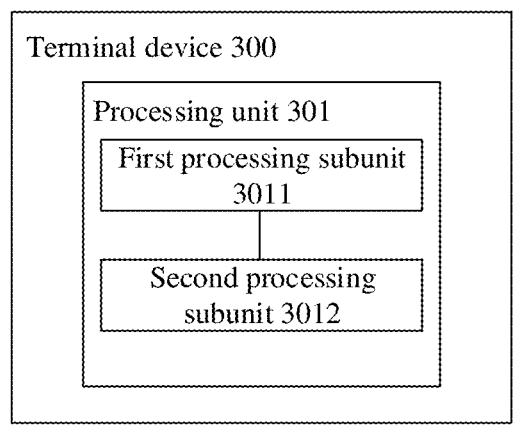
FIG. 7 is a composition structure diagram of a terminal device according to an embodiment of the disclosure.

For implementing the abovementioned link transmission method, the embodiments of the disclosure further provide a terminal device. A composition structure of the terminal device 300 is shown in FIG. 7, which includes a processing unit 301.

The processing unit 301 is configured to, in a case that first transmission and second transmission cannot be simultaneously performed, determine to preferentially perform at least one first transmission.

In the embodiment of the disclosure, the first transmission includes first transmission of a different access type, and/or, the second transmission includes second transmission of a different access type. The access types include at least one of a RAT or a cell group.

In the embodiment of the disclosure, the processing unit 301 is configured to, responsive to that a first type of first transmission exists, determine to preferentially perform the first type of first transmission.

In the embodiment of the disclosure, the processing unit 301 is configured to, based on a logic channel attribute, determine to preferentially perform at least one the first type of first transmission.

The first type is configured in advance or is configured by a network device configuration.

In the embodiment of the disclosure, the processing unit 301 is further configured to compare the at least one first transmission with at least one second transmission.

In the embodiment, the at least one second transmission includes at least one second transmission selected according to different access types. Alternatively, the at least one second transmission includes second transmission of the same access type as the at least one first transmission.

In the embodiment of the disclosure, the processing unit 301 is further configured to compare the at least one first transmission with first transmission of a different access type, and/or second transmission of a different access type.

In the embodiment of the disclosure, the processing unit 301 is configured to, when the at least one second transmission is a second type of access transmission, to preferentially perform the at least one first transmission.

The second type is configured in advance, or the second type is configured by a network device configuration.

In the embodiment of the disclosure, the network device configuration includes: configuration based on the logic channel attribute, and/or configuration based on the logic channel identifier.

In the embodiment of the disclosure, the processing unit 301 is further configured to determine whether a first type of first transmission exists.

In the embodiment of the disclosure, the basis on which the processing unit 301 determines whether the first type of first transmission exists includes different scenarios.

Different scenarios include at least one of the following: whether the terminal device supports cross-RAT configuration, whether the network device supports cross-RAT configuration, whether the terminal device supports to perform TDM switch transmission among different PC5 RATs, or whether the terminal device supports PC5 transmission of multiple RATs.

In the embodiment of the disclosure, the processing unit 301 is further configured to determine whether to perform first transmission other than the at least one first transmission and second transmission.

In the embodiment of the disclosure, the processing unit 301 is further configured to determine not to perform first transmission and second transmission other than the at least one first transmission.

In the embodiment of the disclosure, the processing unit 301 is configured to determine to perform first transmission other than the at least one first transmission.

In the embodiment of disclosure, the first transmission other than the at least one first transmission includes: first transmission in the same access type as the at least one first transmission; or first transmission in a different access type from the at least one first transmission; or all first transmission other than the at least one first transmission.

In the embodiment of the disclosure, the processing unit 301 is configured to determine to perform at least one second transmission. The at least one first transmission and the at least one second transmission are in the same or different access types.

In the embodiment of the disclosure, the processing unit 301 determines to preferentially perform at least one first transmission after or before an MAC PDU of the at least one first transmission is generated. The MAC PDU of the at least one first transmission has been stored in an HARQ cache.

In the embodiment of the disclosure, the processing unit 301 determines to preferentially perform at least one first transmission before a first processing time.

In the embodiment of the disclosure, the processing unit 301 determines whether to perform the first transmission other than the at least one first transmission and second transmission after or before an MAC PDU of the first transmission other than the at least one first transmission and/or an MAC PDU of the second transmission is generated.

In the embodiment of the disclosure, the MAC PDU of the first transmission other than the at least one first transmission and/or the MAC PDU of the second transmission has been stored in the HARQ cache.

In the embodiment of the disclosure, the processing unit 301 is configured to determine whether to perform the first transmission other than the at least one first transmission and second transmission before a second processing time.

In the embodiment of the disclosure, the processing unit 301 includes a first processing subunit 3011 located at an MAC layer entity and a second processing subunit 3012 located at a PHY layer entity.

The first processing subunit 3011 is configured to send information to the second processing subunit.

The second processing subunit 3012 is configured to determine preferentially perform at least one first transmission based on the information.

In the embodiment of the disclosure, the processing unit 301 includes a first processing subunit 3011 located at an MAC layer entity and a second processing subunit 3012 located at a PHY layer entity.

The first processing subunit 3011 is configured to send information to the second processing subunit.

The second processing subunit 3012 is configured to determine whether to perform first transmission other than the at least one first transmission and second transmission based on the information.

In the embodiment of the disclosure, the information includes at least one of a data attribute, a logical channel attribute, a data priority or a logical channel priority. Alternatively, the information includes at least one of the first transmission or the second transmission which are is preferentially performed.

In the embodiment of the disclosure, the first transmission is uplink transmission, and the second transmission is side link transmission.

In the embodiment of the disclosure, the first transmission is side link transmission, and the second transmission is uplink transmission.

In the embodiment of the disclosure, both the first transmission and the second transmission include at least one of a data channel or a control channel.

The embodiments of the disclosure further provide a terminal device, which includes a processor and a memory configured to store a computer program capable of running in the processor. The processor is configured to run the computer program to execute the operations of the abovementioned link transmission method.

Figure 8:
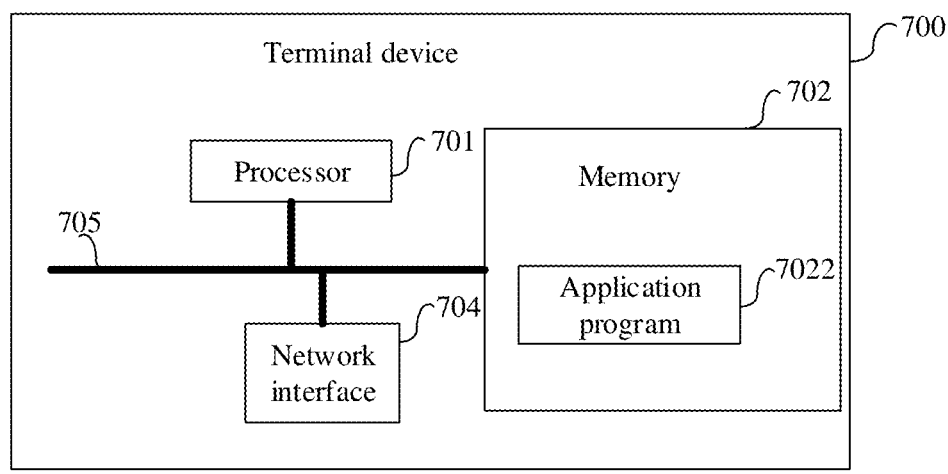
FIG. 8 is a hardware composition structure diagram of a terminal device according to an embodiment of the disclosure.

FIG. 8 is a hardware composition structure diagram of a terminal device according to an embodiment of the disclosure. The terminal device 700 includes at least one processor 701, a memory 702, and at least one network interface 704. All components in the terminal device 700 are coupled together through a bus system 705. It can be understood that the bus system 705 is configured to implement connection communication between these components. The bus system 705 includes a power bus, a control bus and a state signal bus in addition to a data bus. However, for clear description, various buses in FIG. 8 are marked as the bus system 705.

It can be understood that the memory 702 may be a volatile memory or a nonvolatile memory, and may also include both the volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, a compact disc, or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory 702 described in the embodiment of the disclosure is intended to include, but not limited to, memories of these and any other proper types.

In the embodiment of the disclosure, the memory 702 is configured to store various types of data to support the operation of the terminal device 700. Examples of the data include any computer program, for example, an application program 7022, operated in the terminal device 700. A program implementing the method of the embodiments of the disclosure may be included in the application program 7022.

The method disclosed in the embodiments of the disclosure may be applied to the processor 701 or implemented by the processor 701. The processor 701 may be an integrated circuit chip with a signal processing capability. In an implementation process, each operation of the method may be completed through an integrated logical circuit of hardware in the processor 701 or an instruction in a software form. The processor 701 may be a universal processor, a Digital Signal Processor (DSP) or another Programmable Logic Device (PLD), a discrete gate or transistor logic device, a discrete hardware component, etc. The processor 701 may implement or execute each method, operation and logical block diagram disclosed in the embodiments of the disclosure. The universal processor may be a microprocessor, any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be in a storage medium, and the storage medium is in the memory 702. The processor 701 reads information in the memory 702 and implements the operations of the method in combination with hardware.

In an exemplary embodiment, the terminal device 700 may be implemented by one or more Application Specific Integrated Circuits (ASICs), DSPs, PLDs, Complex Programmable Logic Devices (CPLDs), Field Programmable Gate Arrays (FPGAs), universal processors, controllers, Micro Controller Units (MCUs), Microprocessor Units (MPUs), or other electronic components, and is configured to execute the abovementioned method.

The embodiments of this disclosure further provide a storage medium, which is configured to store a computer program.

Optionally, the storage medium may be applied to a terminal device in the embodiments of this disclosure, and the computer program enables a computer to execute corresponding flows in each method of the embodiments of this disclosure. For simplicity, elaborations are omitted herein.

The disclosure is described with reference to flowcharts and/or block diagrams of the method, device (system), and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor, or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to operate in a specific manner, so that a product including an instruction device may be generated by the instructions stored in the computer-readable memory, the instruction device can implement the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and operations for realizing the function specified in one flow or multiple flows in the flowcharts and/or one block or multiple blocks in the block diagrams are provided by the instructions executed on the computer or the other programmable data processing device.

The above is only the preferred embodiment of the disclosure and not intended to limit the scope of protection of the disclosure. Any modifications, equivalent replacements, improvements made within the spirit and principle of the disclosure shall fall within the scope of protection of the disclosure.

The invention claimed is:

1. A link transmission method, comprising:
in a case that at least one first transmission and at least one second transmission are unable to be simultaneously performed, determining, by a terminal device, to preferentially perform the at least one first transmission,
wherein the at least one first transmission comprises first transmission using an access type from different access types, and the access types comprise a Long Term Evolution (LTE) and a New Radio (NR),
wherein the determining, by the terminal device, to preferentially perform the at least one first transmission comprises:
in a case that at least one first type of first transmission exists, determining to preferentially perform the at least one first type of first transmission,
wherein the determining, by the terminal device, to preferentially perform the at least one first type of first transmission comprises:
determining, based on a logical channel attribute of Physical Uplink Control Channel (PUCCH), Physical Sidelink Control Channel (PSCCH) and Physical Sidelink Feedback Channel (PSFCH), to preferentially perform the at least one first type of first transmission, wherein the first type is configured by a configuration sent by a network device to the terminal device, the configuration comprises a configuration based on the logical channel attribute, and the logical channel attribute comprises a logical channel priority,
wherein the at least one first type of first transmission is a first transmission with a logical channel having the logical channel priority higher than a specific value.

2. The method of claim 1, further comprising:
comparing, by the terminal device, the at least one first transmission with the at least one second transmission.

3. The method of claim 2, further comprising:
in a case that the at least one second transmission is a second type of second access transmission, preferentially perform the at least one first transmission,
wherein the second type is configured by a network device configuration.

4. The method of claim 1, further comprising:
determining, by the terminal device, whether to perform first transmission other than the at least one first transmission and second transmission.

5. The method of claim 4, wherein the determining, by the terminal device, whether to perform first transmission other than the at least one first transmission and second transmission comprises:
determining, by the terminal device, to perform first transmission other than the at least one first transmission.

6. The method of claim 1, wherein the terminal device determines to preferentially perform the at least one first transmission after a Medium Access Control (MAC) Protocol Data Unit (PDU) of the at least first transmission is generated.

7. The method of claim 1, wherein the determining, by the terminal device, to preferentially perform at least one first transmission comprises:
sending, by a media access control (MAC) layer entity of the terminal device, information to a physical (PHY) layer entity; and
determining, by the PHY layer entity based on the information, to preferentially perform the at least one first transmission,
wherein the information comprises at least one of: a data priority or a logical channel priority.

8. The method of claim 1, wherein the at least one first transmission is side link transmission, and the at least one second transmission is uplink transmission.

9. The method of claim 1, wherein both the at least one first transmission and the at least one second transmission comprise a data channel.

10. The method of claim 1, wherein the at least one first transmission is uplink transmission, and the at least one second transmission is side link transmission.

11. A terminal device, comprising:
a processor; and
a memory having stored thereon a computer program capable of running in the processor,
wherein the processor is configured to run the computer program to, in a case that at least one first transmission and at least one second transmission are unable to be simultaneously performed, determine to preferentially perform the at least one first transmission by the terminal device,
the at least one first transmission comprises first transmission using an access type from different access types, and the access types comprise a Long Term Evolution (LTE) and a New Radio (NR), wherein the processor is configured to run the computer program to, in a case that at least one first type of first transmission exists, determine to preferentially perform the at least one first type of first transmission, wherein the processor is configured to run the computer program to determine, based on a logical channel attribute of Physical Uplink Control Channel (PUCCH), Physical Sidelink Control Channel (PSCCH) and Physical Sidelink Feedback Channel (PSFCH), to preferentially perform the at least one first type of first transmission, wherein the first type is configured by a configuration sent by a network device to the terminal device, the configuration comprises a configuration based on the logical channel attribute, and the logical channel attribute comprises a logical channel priority, wherein the at least one first type of first transmission is a first transmission with a logical channel having the logical channel priority higher than a specific value.

12. The terminal device of claim 11, wherein the processor is configured to run the computer program to compare the at least one first transmission with the at least one second transmission.

13. The terminal device of claim 12, wherein the processor is configured to run the computer program to, in a case that the at least one second transmission is a second type of second access transmission, preferentially perform the at least one first transmission, wherein the second type is configured by a network device configuration.

14. The terminal device of claim 11, wherein the processor is configured to run the computer program to determine whether to perform first transmission other than the at least one first transmission and second transmission.

15. The terminal device of claim 14, wherein the processor is configured to run the computer program to determine to perform the first transmission other than the at least one first transmission.

16. The terminal device of claim 11, wherein the processor is configured to run the computer program to determine to preferentially perform the at least one first transmission after a Medium Access Control (MAC) Protocol Data Unit (PDU) of the at least first transmission is generated.

17. The terminal device of claim 11, wherein the processor comprises a first processor at a media access control (MAC) layer entity and a second processor at a physical (PHY) layer entity, wherein the first processor is configured to send information to the second processor; and the second processor is configured to determine, based on the information, to preferentially perform the at least one first transmission, wherein the information comprises at least one of a data priority or a logical channel priority.

18. The terminal device of claim 11, wherein the at least one first transmission is side link transmission, and the at least one second transmission is uplink transmission.

19. The terminal device of claim 11, wherein both the at least one first transmission and the at least one second transmission comprise a data channel.

20. The terminal device of claim 11, wherein the at least one first transmission is uplink transmission, and the at least one second transmission is side link transmission.

* * * * *